United States Patent Office 3,196,121
Patented July 20, 1965

3,196,121
COATING COMPOSITION COMPRISING AN OXYGEN-CONTAINING DIOLEFIN POLYMER AND A DRYING OIL
John F. McKay, deceased, late of Cranford, N.J., by William M. Elliott, administrator, Staten Island, N.Y., and Donald F. Koenecke, Westfield, N.J., assignors to Esso Research and Engineering Company, a corporation of Delaware
No Drawing. Continuation of application Ser. No. 783,690, Dec. 30, 1958. This application May 29, 1962, Ser. No. 198,649
14 Claims. (Cl. 260—23.7)

This application is a continuation of our prior copending application Serial No. 783,690, filed December 30, 1958, now abandoned.

This invention relates to an improved coating composition and improved film therefrom and more particularly to a method for increasing the impact resistance and for preventing eyeholing of an oxidized polymeric film.

The preparation of a liquid polymer of a $C_4$ to $C_6$ conjugated diolefin with subsequent chemical modification to incorporate oxygen in its structure is known in the art. In the past, this oxidized polymeric oil has been applied to the surface of a material and cured to provide a film therefrom. However, it has been found that the impact resistance of the cured film is relatively poor. Therefore, a serious problem occurs in certain instances where the aforementioned characteristic is omnipotent. Furthermore, eyeholing frequently occurs when the film has been cured by baking.

It has now been discovered that the impact resistance of the film can be substantially improved and eyeholing can be alleviated by incorporating in the oxidized polymer the combination of a conjugated drying oil and a phosphoric compound having at least one replaceable acidic hydrogen atom.

Thus in accordance with one embodiment of this invention a polymer of a $C_4$ to $C_6$ conjugated diolefin is prepared. The polymer is then oxidized by blowing it with air or by incorporating an unsaturated dicarboxylic acid anhydride therein. This oxidized polymer is subsequently mixed with the aforementioned phosphoric compound and drying oil to provide a coating composition. The admixture therefrom is then applied to the surface of a material, e.g., a metal plate, and cured to provide a film with increased impact resistance.

Polymeric oils included in this invention are prepared from diolefins, particularly those which are conjugated and have 4 to 6 carbon atoms per molecule, such as butadiene, hexadiene, isoprene, dimethyl butadiene, piperylene, and methyl pentadiene. Diolefins may be used which are copolymerized with minor amounts of ethylenically unsaturated monomers as styrene, acrylonitrile, methyl vinyl ketone, or with styrenes having alkyl groups substituted on the ring, e.g., paramethyl styrene, dimethyl styrene, etc.

A preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises. The preparation of this oil in the presence of an alkali metal or peroxide catalyst is described in U.S. Patents 2,762,851 and 2,586,594 which are incorporated herein by reference.

These polymeric drying oils are then oxidized by blowing them with air or oxygen, preferably in the presence of a solvent, such as aromatic solvents or solvent mixtures having a kauri-butanol value of at least 50. The choice of solvents will depend upon the oxygen content desired in the finished oil, the formation of the coating compositions, and the most economical one to achieve the desired results. Examples of suitable solvents include aromatic hydrocarbons, with or without aliphatic hydrocarbons, boiling up to about 250° C., preferably between 100° and 200° C. The oxidation can be carried out by blowing air or oxygen into the polymer with or without a catalyst. Suitable catalysts are organic salts of metals such as cobalt, lead, iron, and manganese. The naphthenates, octoates, and oleates are especially suitable. These catalysts are used in amounts ranging from 0.001% to 1.0%. The nature of the oxidized diolefin polymer largely depends upon the type of original polymerization and the extent of oxidation which is dependent upon various factors as time, temperature, catalyst, and solvent. Preferred compounds are the oxidized copolymers of 75 to 85% butadiene and 25 to 15% styrene with about 10 to 20% oxygen in the structure.

It is also within the purview of this invention to incorporate oxygen in the structure of a polydiolefin oil by the addition of an anhydride of an unsaturated dicarboxylic acid, e.g., maleic anhydride, chloromaleic anhydride or citraconic anhydride. However, maleic anhydride is preferred. This modification can be accomplished by adding maleic anhydride to the reactants prior to the polymerization. However, the preferred method is to add maleic anhydride to the oil after polymerization and heat the mixture therefrom at a temperature of between 50° and 250° C., preferably 180° to 220° C. for about 15 minutes to 2 hours. In accordance with this invention, it is preferred for the polymeric oil to be modified with between 0.01 and 2.5%, preferably 0.05 to 0.5% of the unsaturated anhydride, e.g., maleic anhydride. This chemical modification of the curable drying oil is described in U.S. Patent 2,652,342 which is also incorporated herein by reference.

In accordance with this invention it is necessary to incorporate both a conjugated drying oil and an acid phosphorus compound in the oxidized polymer to provide the improved coating composition. In the present invention, an acid phosphorus compound is defined as an acid of phosphorus or an acid derivative having at least one replaceable acidic hydrogen atom. Examples of the acids are orthophosphoric acid ($H_3PO_4$); pyrophosphoric acid ($H_4P_2O_7$); orthophosphorous acid ($H_3PO_3$); and hypophosphorous acid ($H_3PO_2$). Examples of the acid derivatives include inorganic salts such as $NaH_2PO_4$, $Na_2HPO_4$, $Zn(H_2PO_4)_2$, $ZnH_2PO_4$, $NH_4H_2PO_4$, $(NH_4)_2HPO_4$; and organic esters of phosphates. However, the phosphoric acids are preferred. Furthermore, it is critical to add between 0.01 and 5.0% of phosphoric acid, preferably 0.25–1.5% (based on weight of the oxidized polymer) or equivalent replaceable acidic hydrogen for the success of this invention. (Too high a percentage may bring about an undesirable level of oxidation inhibition.) Above this percentage excessive yellowing and gelation occurs. Below this percentage the over-all effect is negligible.

In addition to the phosphoric acid, it is also necessary to incorporate 5 to 25%, preferably 10 to 20%, of a conjugated drying oil in the oxidized polymeric solution. A drying oil is defined as follows: Glycerides of fat acids which contain two or more double bonds which absorb oxygen on exposure to air. Peroxides are formed which catalyze the polymerization and as a result the oils become solid or semisolid and are known as drying oils. A conjugated drying oil is one in which the double bonds are in alternate positions. It should be noted that a drying oil may be inherently conjugated, e.g., tung oil and oiticia oil; or may be formed by isomerizing a normally unconjugated drying oil, e.g., isomerized linseed oil and isomerized soybean oil; may be prepared by dehydration to introduce a second double bond which is conjugated, e.g., dehydrated castor oil. Therefore, the terminology "conjugated drying oil" is used in the art to define a general group of compounds and each specific oil therein is within the purview of this invention. These conjugated drying oils are described in detail in Noller, Chemistry of Organic Compounds, W. B. Saunders Co. (1951), Chapter II, pp. 178–184, which is incorporated herein by reference.

It may also be advantageous, although not necessary, to include a monohydric $C_5$ to $C_8$ alcohol, e.g., 2-ethyl hexanol, n-octyl, and 2 hexanol, in the oxidized polymeric solution to provide a smoother film. If present, the alcohol generally ranges from 0 to 15%, preferably 3 to 8%, based on oxidized polymer by weight.

This admixture comprising the oxidized polymer, the conjugated drying oil, and acid phosphorus compound is the improved coating composition of this invention which is adaptable to provide a film with increased impact resistance. This coating composition can be applied to the surface of a material, such as a metallic item, e.g., tin plate, by any known method which, therefore, includes spraying, brushing, dipping, and the like. The thickness of the coating can vary over a wide range but, generally, it will be between 0.2 and 4.0 mils. The admixture, which has been applied to the surface, can be cured in accordance with any suitable method known in the art. A preferred method is by baking in an oven at a temperature between 250° and 500° F. for 60 to 3 minutes, respectively. Other methods include infrared baking, electronic induction baking, flame curing, air drying, curing in the presence of $SO_2$, and the like.

Thus, in accordance with this invention an improved end product has been formed. The impact resistance of the film has been vastly increased. Therefore, it is now possible to coat refrigerators, cans, automobiles, and kitchen appliances and provide a film therefrom with the relatively high impact resistance which is required for this use.

The following examples are submitted to illustrate and not to limit this invention.

EXAMPLE I

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 kauri-butanol value (reference scale: Benzene, 100 K.-B. value; n-heptane, 25.4 K.-B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% NVM. The resulting product has a viscosity of 1.5 poises at 50% NVM in Varsol solution and the nonvolatile portion thereof had a viscosity average molecular weight of about 8,000.

A polymeric solution was then provided in a reactor comprising 35 wt. percent of the above copolymer in Solvesso (high percentage of aromatics with an API gravity 30.2, a flash point of 118° C., and a boiling range of 322°–351° F.). The solution was blown with oxygen for 2 hours and 15 minutes at 240° F. in the presence of 0.01 wt. percent of manganese as the naphthenate soap as a catalyst to incorporate 10% oxygen in the structure of the copolymer. The solution with the oxidized polymer therein was stripped at a temperature of 220°–240° F. and a vacuum of 20 mm. Hg to provide a product of 50% NVM.

Various amounts of phosphoric acid ($H_3PO_4$), conjugated drying oils, and 2-ethyl hexyl alcohol were added to 100 parts of the aforementioned oxidized polymeric solution. Each of these admixtures was applied by spraying a one mil coating on a polished steel plate. The coated panels were subsequently cured at 350° F. for 30 minutes to provide films A through J. The impact resistance was measured on a Gardner variable impact tester (rating with 30× magnification) as indicated in Table I.

All percentages in all examples are based on 100 parts of oxidized polymer.

*Table I*

| Film | Phosphoric Acid, percent | Drying Oil | Drying Oil, percent | 2-ethyl Hexanol, percent | Impact (inch lb.) | |
|---|---|---|---|---|---|---|
| | | | | | Direct | Reverse |
| A | | | | | 25 | 10 |
| B | 1 | | | | 40 | 15 |
| C | 1 | | | 5 | 45 | 25 |
| D | | Tung Oil | 10 | | 55 | 25 |
| E | | Alkali refined linseed oil | 10 | | 30 | <4 |
| F | | Soya | 10 | | 30 | <4 |
| G | | Castor Oil (medical) | 10 | | 25 | <4 |
| H | | Castor 1066 [a] | 10 | | 30 | 4 |
| I | 1 | Tung Oil | 15 | 5 | >80 | 70 |
| J | 1 | Castung 103-GH [b] | 15 | | >80 | 70 |

[a] Chemically treated castor oil.
[b] Dehydrated castor oil.

Films K through P were provided in a similar manner as described above except $TiO_2$ enamel was incorporated in the oxidized polymeric solution. The physical properties of these films are shown in Table II.

*Table II*

| Film | Phosphoric Acid, percent | Drying Oil | Drying Oil, percent | 2-ethyl Hexanol, percent | Impact (inch lb.) | |
|---|---|---|---|---|---|---|
| | | | | | Direct | Reverse |
| K | | | | | 30 | <4 |
| L | 1 | | | | 30 | 4 |
| M | 1 | | | 5 | 40 | 6 |
| N | | Tung Oil | 10 | | 40 | 20 |
| O | 1 | do | 15 | 5 | 80 | 45 |
| P | 1 | Castung 103-GH | 15 | | 80 | 35 |

This example demonstrates that it is essential for the success of this invention to incorporate both phosphoric acid and a conjugated drying oil in the oxidized polymeric solution to provide a substantially improved, impact-resistant film.

EXAMPLE 2

An oxidized polymeric solution was prepared by the same procedure as described in Example 1. Various amounts of phosphoric acid, conjugated drying oils, and 2-ethyl hexanol were again added to this solution. The curing and testing procedures were similar to those previously described in Example 1. The results are indicated in Table III.

Table III

| Film | Phosphoric Acid, Percent | Drying Oil | Drying Oil, Percent | 2-Ethyl Hexanol, Percent | Rating |
|---|---|---|---|---|---|
| Q | | | | | 3 |
| R | | Tung Oil | 15 | 5 | 3 |
| S | 1 | | | 5 | 1 |
| T | 1 | Tung Oil | 15 | 5 | 0 |
| U | 1 | ----do---- | 10 | 5 | 0 |
| V | 1 | ----do---- | 5 | 5 | 0 |
| W | 1 | ----do---- | 15 | 5 | 0 |
| X | 1 | Castung 103-GH | 15 | 5 | 0 |

The rating system for this example:
 0—No eyeholes, excellent.
 1—Occasional, scattered eyeholes, generally acceptable.
 2—Frequent eyeholes, improved but not generally acceptable.
 3—Control, normal eyeholing, many imperfections.
 4—Worse than control.

This example shows that the addition of either the phosphoric acid or the conjugated drying oil alone does not eliminate eyeholing. However, the combination of both materials does eliminate eyeholing.

Having described the general nature and embodiments of this invention, the true scope is now particularly pointed out in the appended claims.

What is claimed is:

1. A composition of matter which comprises a liquid polymer of butadiene and styrene of at least 75 wt. percent butadiene which has been air blow to incorporate from 10 to 20% oxygen in its structure; from 0.01 to 5.0% of orthophosphoric acid; and from 5 to 25% of tung oil.

2. A composition of matter which comprises a liquid polymer of from about 75 to about 85% butadiene and from about 25 to about 15% styrene which has been air blown to incorporate from about 10 to about 20% oxygen in its structure, between about 10 and about 20% of a conjugated drying oil and between about 0.25 and about 1.5% of an acid phosphorus compound selected from the group consisting of an inorganic acid of phosphorus and the metallic salts thereof containing at least one replaceable acidic hydrogen therein.

3. The composition of matter according to claim 2 in which no more than about 15% of a monohydric $C_5$ to $C_8$ alcohol is included therein.

4. A composition of matter which comprises:
 (A) a polymeric composition selected from the group consisting of
  (1) a liquid polymer of a $C_4$–$C_6$ conjugated diolefin which has been reacted with a member of the group consisting of air and oxygen so as to incorporate between about 10 and about 20% oxygen in its structure and
  (2) a liquid polymer of a $C_4$–$C_6$ conjugated diolefin which has been reacted with between about 0.01 and about 2.5 wt. percent of an anhydride selected from the group consisting of maleic anhydride, chlormaleic anhydride and citraconic anhydride,
 (B) between about 5 and about 25% of a conjugated drying oil and
 (C) between about 0.01 and about 5.0% of an acid phosphorus compound selected from the group consisting of an inorganic acid of phosphorus and the metallic salts thereof containing at least one replaceable acidic hydrogen therein.

5. The composition of matter according to claim 4 wherein the liquid polymer is the homopolymer of butadiene.

6. The composition of matter according to claim 4 wherein the liquid polymer is a copolymer of butadiene and styrene containing at least 75 wt. percent butadiene.

7. The composition of matter according to claim 4 wherein no more than about 15% of a monohydric $C_5$–$C_8$ alcohol is included therein.

8. A composition of matter which comprises (A) a liquid polymer of $C_4$–$C_6$ conjugated diolefin which has been reacted with a member of the group consisting of air and oxygen so as to incorporate between about 10 and about 20% oxygen in its structure, (B) between about 5 and about 25% of a conjugated drying oil and (C) between about 0.01 and about 5.0% of an acid phosphorus compound selected from the group consisting of an inorganic acid of phosphorus and the metallic salts thereof containing at least one replaceable acidic hydrogen therein.

9. The composition of matter according to claim 8 wherein the liquid polymer is selected from the group consisting of the homopolymer of butadiene and a copolymer of butadiene and styrene containing at least 75 wt. percent butadiene.

10. The composition of matter according to claim 8 wherein the conjugated drying oil is selected from the group consisting of tung oil, oiticia oil, isomerized linseed oil, isomerized soybean oil and dehydrated castor oil.

11. A composition of matter which comprises (A) a liquid polymer of a $C_4$–$C_6$ conjugated diolefin which has been reacted with between about 0.01 and about 2.5 wt. percent of an anhydride selected from the group consisting of maleic anhydride, chlormaleic anhydride and citraconic anhydride, (B) between about 5 and about 25% of a conjugated drying oil, and (C) between about 0.01 and about 5.0% of an acid phosphorus compound selected from the group consisting of an inorganic acid of phosphorus and the metallic salts thereof containing at least one replaceable acidic hydrogen therein.

12. The composition of claim 11 wherein the liquid polymer is selected from the group consisting of the homopolymer of butadiene and a copolymer of butadiene and styrene containing at least 75 wt. percent butadiene.

13. The composition of claim 11 wherein the conjugated drying oil is selected from the group consisting of tung oil, oiticia oil, isomerized linseed oil, isomerized soybean oil and dehydrated castor oil.

14. A coating with improved impact resistance which comprises a liquid polymer of a $C_4$–$C_6$ conjugated diolefin which has been air-blown to incorporate between about 10 and about 20% oxygen in its structure and which has been cured on and which is adhered to the surface of a material in the presence of between 5 and about 25% of a conjugated drying oil and between about 0.01 and about 5.0% of an acid phosphorus compound selected from the group consisting of an inorganic acid of phosphorus and the metallic salts thereof containing at least one replaceable acid hydrogen therein.

References Cited by the Examiner
UNITED STATES PATENTS

| | | | |
|---|---|---|---|
| 2,492,124 | 12/49 | Young et al. | 260—23.7 |
| 2,513,389 | 7/50 | Young et al. | 260—23.7 |
| 2,634,256 | 4/53 | Sparks et al. | 260—23.7 |
| 2,876,207 | 3/59 | Henderson | 260—30.6 |
| 2,880,188 | 3/59 | McKay | 260—23.7 |
| 2,893,885 | 7/59 | Hutchinson et al. | 260—23.7 |
| 3,004,937 | 10/61 | Van Nostrand et al. | 260—85.1 |

LEON J. BERCOVITZ, *Primary Examiner.*
DONALD E. CZAJA, *Examiner.*